Jan. 20, 1953  A. F. HASBROOK  2,626,004
APPARATUS FOP RECORDING TIME INTERVALS
Filed Jan. 19, 1950
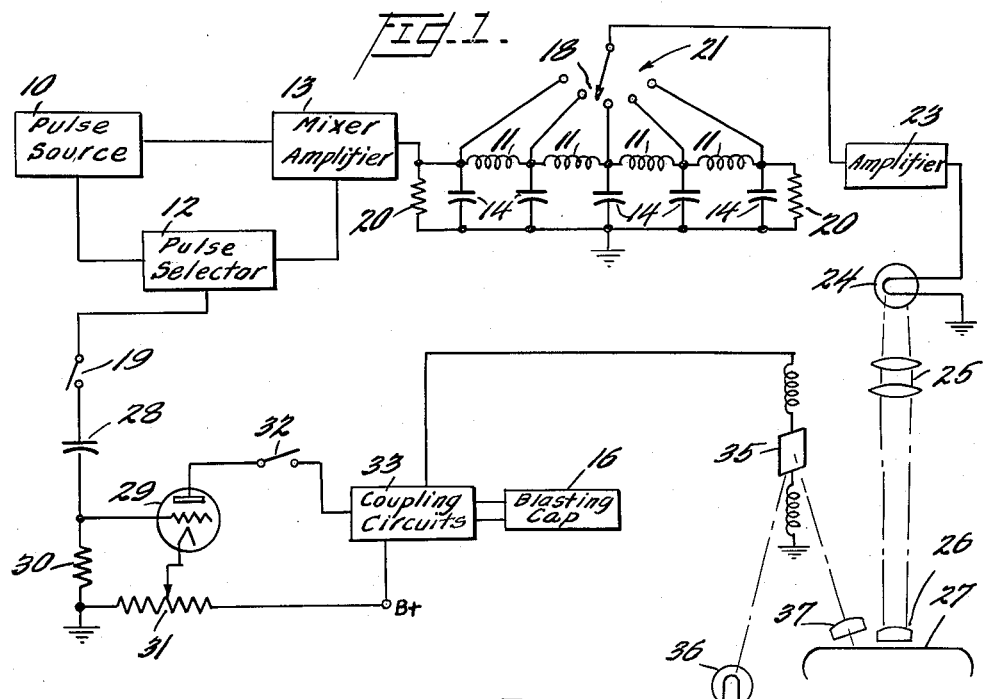
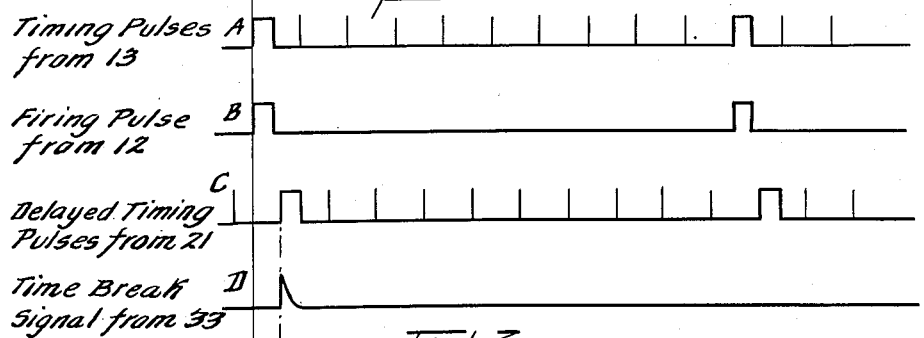
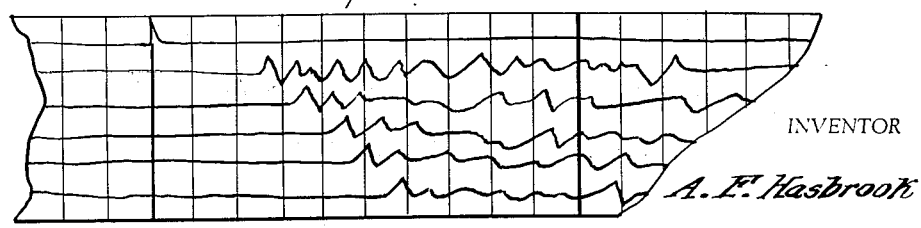
INVENTOR
A. F. Hasbrook
BY Watson, Cole, Grindle + Watson
ATTORNEY Patented Jan. 20, 1953

2,626,004

UNITED STATES PATENT OFFICE 2,626,004

APPARATUS FOR RECORDING TIME INTERVALS

Arthur F. Hasbrook, San Antonio, Tex., assignor to Olive S. Petty, San Antonio, Tex.

Application January 19, 1950, Serial No. 139,430

5 Claims. (Cl. 181—.5)

This invention relates to apparatus for use in seismic surveying, and has for an object the provision of electronic means for effecting synchronization of the recording of timing indicia on the seismogram with the detonation of the explosive charge by which the seismic impulses are propagated. It has heretofore been recognized that synchronization of the time scale with the time-break signal, indicating the instant of firing the charge is recorded, is highly desirable. Thus if the time-break signal can be recorded in coincidence with a timing line, and more especially with a distinctively marked timing line, the record can be studied and interpreted far more easily than if the time-break occurs at random, since the elapsed time between the detonation of the explosive and any particular event on the record may be directly read without interpolation when synchronization is established. Unfortunately, apparatus heretofore suggested for the purpose of achieving such synchronization can neither be adjusted nor maintained in adjustment so as to afford the accuracy which is required for practical and effective use in the seismic field.

In accordance with the present invention, extreme accuracy of synchronization of timing indicia with the time-break is achieved by generating cyclic impulses corresponding to the desired timing indicia, utilizing these impulses to effect recording on the seismogram of conventional indicia or timing lines, employing electronic circuits to detonate the explosive charge, and applying the cyclic pulses to energize the electronic circuits. By this method I am enabled to avoid the use of mechanical timing devices for detonating the explosive, thereby eliminating one of the principal sources of inaccuracy in synchronizing systems heretofore proposed. Furthermore, whereas previous systems have required the close cooperation of skilled operators located respectively adjacent the shot point and adjacent the recording station, apparatus of the character proposed herein may be entirely automatic, the entire operation being initiated by one operator and proceeding without intervention to ensure precise concurrence of the time-break and the recorded time indicia.

Further objects and features of the invention will be apparent from the following description taken in connection with the accompanying drawings in which Figure 1 is a diagrammatic representation of apparatus embodying the principles of the invention for electronic synchronization of the time break with the timing indicia;

Figure 2 is a graph representing pulses appearing at various points in the apparatus shown in Figure 1; and Figure 3 is a seismogram representative of the type of record which may be obtained by the practice of the invention.

In order to facilitate an understanding of the invention, reference is made herein to the preferred embodiment illustrated in Figure 1, and specific language is employed to describe the same. It will nevertheless be appreciated that no limitation of the scope of the invention is thereby intended, various further modifications and alterations being contemplated such as would normally occur to those skilled in the art to which the invention relates.

In Figure 1 is represented schematically a pulse source 10, a pulse selector 12 energized from the source 10, and a mixer-amplifier 13 in which signal energy from the pulse source and the pulse selector are combined substantially in multiple phase relation. The pulse source 10 may be constituted by any conventional device for generating cyclic impulses. The pulse selector 12 may comprise any suitable type of frequency divider, such as a blocking oscillator, a multivibrator or the like, capable of producing a signal having a repetition rate which is a submultiple of the rate of the energizing signal, the latter being derived from source 10. Preferably the characteristics of selector 12 are such that the output pulses of the selector are of longer duration than the pulses from source 10. When signals from source 10 and selector 12 are combined and amplified, the combined signal may conform generally to that shown at A in Figure 2, and this signal may be utilized to produce on the seismogram timing indicia of the character represented in Figure 3, in which timing lines occurring at predetermined intervals (for instance every tenth line), corresponding to pulses derived from selector 12, are more heavily marked or otherwise distinguished from the remainder. Apparatus of this character, functioning in the manner described, is described and claimed in my copending application Serial No. 51,424, filed September 27, 1948, and reference is made to that application for a more comprehensive description of the apparatus just described.

The cyclic pulses utilized to effect detonation of the explosive charge are preferably those produced by pulse selector 12, represented schematically at B in Figure 2. These pulses are supplied through switch 19 and condenser 28 to the grid of tube 29 which, with grid resistor 30, cathode bias adjustment 31, coupling circuits 33 and switch 32 constitutes a firing circuit for blasting cap 16. Although certain high vacuum tubes may be employed at 29, a thyratron of gas type, capable of delivering high current, is preferred. Cathode bias adjustment 31 is initially set so that tube 29 does not conduct or fire until a sufficiently positive signal is applied to the grid. With switch 32 open, these pulses are ineffective because of the lack of anode potential to fire tube 29. When switch 32 is closed, however, the next pulse on the grid causes tube 29 to deliver a high current to coupling circuits 33 and thence through blasting cap 16. It will be understood that the passage of high current to fire the cap 16 is required only for a very short interval (usually several thousandths of a second) and that the electrical energy involved is small; therefore, a small tube delivering high peak current may be used at 29.

Detonation of cap 16 causes reaction on coupling circuits 33 and thus provides an output signal at the moment of detonation. This signal is applied to oscillograph element 35 which, with light 36, lens system 37 and recording strip 27, effect recording of the time-break or instant of detonation of the explosive charge. Coupling circuits 33 may be of any known type, for instance those shown in either of the United States patents to Petty 2,331,627 or Parr 2,331,623, the arrangement preferably being such that the supply of anode voltage to tube 29 is interrupted on firing of the shot.

Because of delays involved in detonating cap 16 by the pulse from selector 12, it will be appreciated that the timing pulses at the output of mixer amplifier 13 may occur slightly in advance of the time-break. In order to delay the timing pulses and effect precise synchronization of timing lines and time break on the seismogram, a variable delay circuit 21 may be employed between the mixer-amplifier and the recorder. In Figure 1 this delay circuit is represented as comprising a network of inductances 11 and capacitors 14, with which are associated terminating resistors 20. A selector switch 18 is associated with the network so that the required delay in the signal may be adjusted to cause the time break to appear precisely on one of the timing lines, preferably on a specially marked line as shown more particularly in Figure 3. Thus the delayed series of timing pulses from delay circuit 21 may be applied to amplifier 23 and thence to pulsed light source 24, preferably a gas tube which glows upon being triggered, as explained more fully in my copending application, Serial No. 51,424, hereinbefore referred to. The timing pulses of light are then focused by lens system 25 and impressed on photographic recording strip 27 in exact phase with the time-break signal from 33. The preferred relation between the delayed timing pulses and the time-break signal is indicated at C and D, respectively, in Figure 2. Other delay means, such as the conventional multivibrator circuits, may be employed in lieu of the network illustrated.

While the electronic devices for detonating the explosive charge are preferably energized from the pulse selector 12, having an output frequency which is a submultiple of the frequency of the output from pulse source 10, it will be appreciated that my invention is applicable to systems in which distinctive marking of recurrent pulses is not employed, in which event the electronic devices by which the charge is detonated may be energized directly from the source of the cyclic pulses. The invention also contemplates the use of various equivalent methods, differing from that specifically illustrated, of printing timing indicia on the seismogram, provided the necessary synchronism of the timing indicia by the cyclic pulses is thereby achieved.

Having thus described the invention, what is claimed as new and desired to be secured by Letters Patent is:

1. In apparatus for use in seismic surveying, the combination with a recorder, of a generator of cyclic pulses, a pulse selector energized by said cyclic pulses and providing output pulses having a repetition rate which is a submultiple of the repetition rate of the energizing pulses, means combining the output pulses from said generator and said pulse selector in overlapping relation to provide a signal in which pulses corresponding to said submultiple pulses are distinctive, means applying the combined pulses to said recorder to effect recording of timing indicia conforming to the repetition rate of said cyclic impulses, of which recurrent indicia corresponding to said submultiple pulses are distinctive, explosive detonating means, electronic devices for supplying current to said detonating means to effect detonation of the explosive, and electrical connections between said pulse selector and said electronic devices to energize the latter in response to the pulses of lower repetition rate, whereby a predetermined time relation between the recording of the distinctive timing indicia and the instant of detonation of the explosive is established.

2. In apparatus for use in seismic surveying, the combination with a recorder, of a generator of cyclic pulses, a pulse selector energized by said cyclic pulses and providing output pulses having a repetition rate which is a submultiple of the repetition rate of the energizing pulses, means combining the output pulses from said generator and said pulse selector in overlapping relation to provide a signal in which pulses corresponding to said submultiple pulses are distinctive, a variable delay circuit, means applying the combined pulses through said variable delay circuit to said recorder to effect recording of timing indicia conforming to the repetition rate of said cyclic impulses, of which recurrent indicia corresponding to said submultiple pulses are distinctive, explosive detonating means, electronic devices for supplying current to said detonating means to effect detonation of the explosive, and electrical connections between said pulse selector and said electronic devices to energize the latter in response to the pulses of lower repetition rate, whereby a predetermined time relation between the recording of the distinctive timing indicia and the instant of detonation of the explosive may be obtained by adjusting said variable delay circuit.

3. In apparatus for use in seismic surveying, the combination with a recorder, of a generator of cyclic pulses, a pulse selector energized by said cyclic pulses and providing output pulses having a repetition rate which is a submultiple of the repetition rate of the energizing pulses, means combining the output pulses from said generator and said pulse selector in overlapping relation to provide a signal in which pulses corresponding to said submultiple pulses are distinctive, a variable delay circuit, means applying the combined pulses through said variable delay circuit to said recorder to effect recording of timing indicia conforming to the repetition rate of said cyclic impulses, of which recurrent indicia corresponding to said submultiple pulses are distinctive, explosive detonating means, electronic devices for supplying current to said detonating means to effect detonation of the explosive, electrical connections between said pulse selector and said electronic devices to energize the latter in response to the pulses of lower repetition rate, and means supplying to said recorder, at the instant of detonation, a time-break signal, whereby precise synchronism of said indicia and the time-break signal may be established by adjusting said variable delay circuit.

4. In apparatus for use in seismic surveying, the combination with a recorder including means for recording timing indicia on a seismogram in response to cyclic impulses, of a variable delay circuit, a generator for applying cyclic impulses through said variable delay circuit to said means, said means being operable by said impulses to cause said recorder to imprint on said seismogram timing indicia conforming to the repetition rate of said cyclic impulses, explosive detonating means, electronic devices for supplying current to said detonating means to effect detonation of the explosive, electrical connections between said generator and said electronic devices to energize the latter in timed relation with said cyclic impulses, and means operable by detonation of the explosive for supplying to said recorder a time-break signal, whereby a predetermined relation between said timing indicia and said time-break signal may be established by adjusting said variable time delay circuit.

5. In apparatus for use in seismic surveying, the combination with a recorder for reproducing on a single record sheet a series of regularly spaced timing indicia, a time-break signal, and seismic traces, of a generator of cyclic impulses, a variable delay circuit, means applying to said recorder through said variable delay circuit the cyclic impulses from said generator to effect recording of timing indicia conforming to the repetition rate of said cyclic impulses, explosive detonating means, electronic devices responsive to said impulses for supplying current to said detonating means to effect detonation of the explosive, electrical connections between said generator and said electronic devices to energize the latter in response to said cyclic impulses, and means operable by said detonating means for supplying a time-break signal to said recorder at the instant of detonation, whereby precise synchronism of said timing indicia and the time-break signal may be affected by adjusting said variable delay circuit to compensate for delay in detonating said explosive.

ARTHUR F. HASBROOK.

REFERENCES CITED

The following references are of record in the file of this patent:

UNITED STATES PATENTS

| Number | Name | Date |
| --- | --- | --- |
| 2,275,316 | Ritzmann | Mar. 3, 1942 |
| 2,313,091 | Renner | Mar. 9, 1943 |
| 2,470,846 | De Boisblanc et al. | May 24, 1949 |
| 2,490,461 | McKinney | Dec. 6, 1949 |